(12) United States Patent
Jibu et al.

(10) Patent No.: US 8,665,524 B2
(45) Date of Patent: Mar. 4, 2014

(54) LONG-LENGTH LENS

(75) Inventors: Yasuomi Jibu, Ichinomiya (JP); Junji Fujitani, Nagoya (JP); Yasuhiro Ideno, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 3 days.

(21) Appl. No.: 13/072,740

(22) Filed: Mar. 27, 2011

(65) Prior Publication Data

US 2011/0242673 A1    Oct. 6, 2011

(30) Foreign Application Priority Data

Mar. 31, 2010   (JP) ................. 2010-082386

(51) Int. Cl.
*G02B 3/00* (2006.01)
*G02B 7/02* (2006.01)

(52) U.S. Cl.
USPC .......... 359/642; 359/206.1; 359/662

(58) Field of Classification Search
USPC ............ 359/206.1, 642, 662, 725; D16/134–136
See application file for complete search history.

(56) References Cited

U.S. PATENT DOCUMENTS

| | | | |
|---|---|---|---|
| 6,807,011 B2 * | 10/2004 | Cannon et al. ............... | 359/642 |
| 7,889,426 B2 | 2/2011 | Takeuchi et al. | |
| 2004/0257630 A1 * | 12/2004 | Kim ............. | 359/206 |
| 2007/0002446 A1 | 1/2007 | Takeuchi et al. | |
| 2007/0087068 A1 | 4/2007 | Eiha | |

FOREIGN PATENT DOCUMENTS

| | | | |
|---|---|---|---|
| JP | H02-157703 A | 6/1990 |
| JP | H05-188285 A | 7/1993 |
| JP | H11-183819 A | 7/1999 |
| JP | 2000-210989 A | 8/2000 |
| JP | 2002-365576 A | 12/2002 |
| JP | 2003-305754 A | 10/2003 |
| JP | 2004-091239 A | 3/2004 |
| JP | 2007-041542 A | 2/2007 |
| JP | 2007-106058 A | 4/2007 |
| JP | 2007-133179 A | 5/2007 |

OTHER PUBLICATIONS

Japan Patent Office, Notification of Reasons for Refusal for Japanese Patent Application No. 2010-082386 (counterpart Japanese patent application), mailed Aug. 21, 2012.

The State Intellectual Property Office of the People'S Republic of China, Notification of First Office Action for Chinese Patent Application No. 201110085160.7 (counterpart Chinese patent application), issued Feb. 26, 2013.

* cited by examiner

*Primary Examiner* — Darryl J Collins
(74) *Attorney, Agent, or Firm* — Baker Botts L.L.P.

(57) ABSTRACT

A lens includes a lens portion having two opposite oblong surfaces at least one of which is a curved lens surface having a reflective power. A cross-sectional area of the lens portion varies from a center toward each end in a longitudinal direction of the lens portion. A rib portion is disposed at each of two opposite sides of the lens portion adjacent to longer sides of the oblong surfaces of the lens portion, and extends along the longitudinal direction of the lens portion. A cross-sectional area of the rib portion varies along the longitudinal direction in a manner that renders variations of a cross-sectional area of a portion including the lens portion and the rib portion along the longitudinal direction of the lens portion smaller.

6 Claims, 6 Drawing Sheets

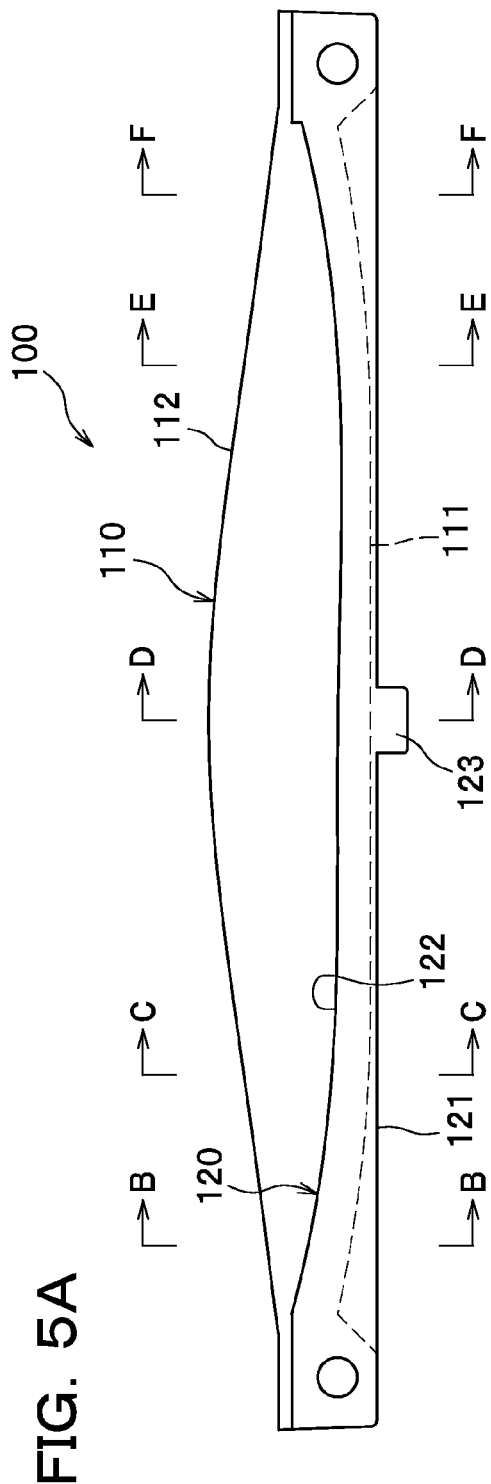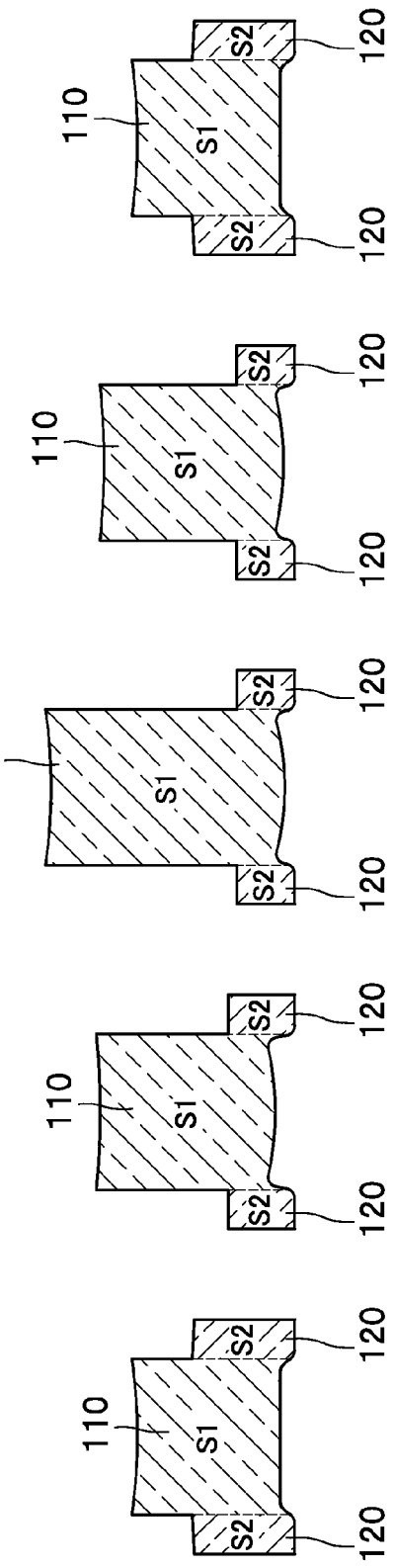

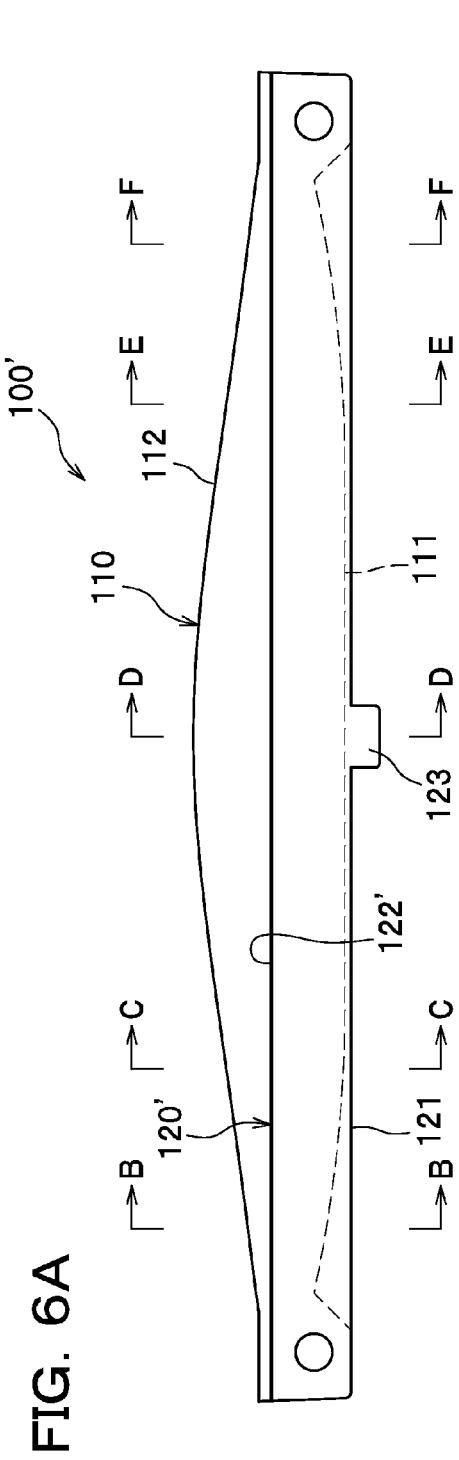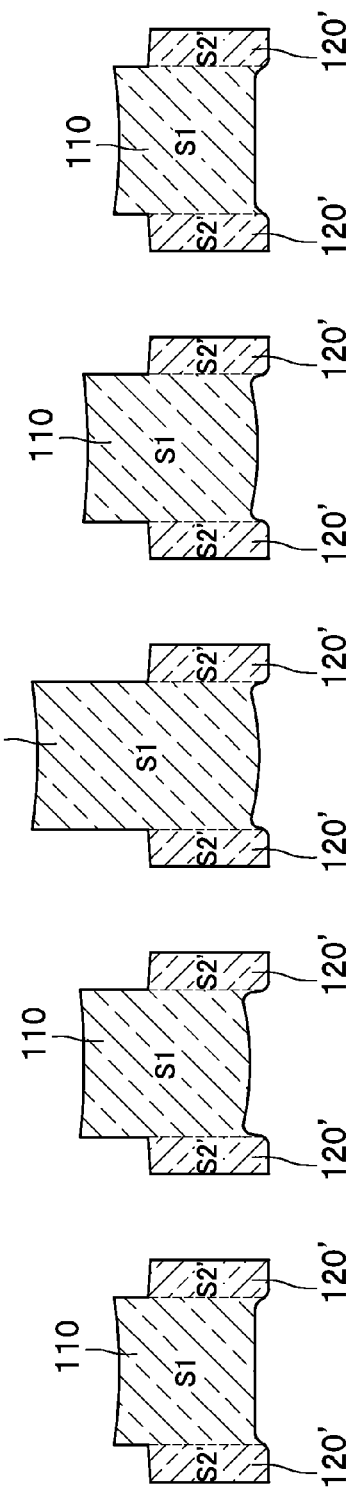

LONG-LENGTH LENS

CROSS-REFERENCE TO RELATED APPLICATION(S)

This application claims priority from Japanese Patent Application No. 2010-082386 filed on Mar. 31, 2010, the disclosure of which is incorporated herein by reference in its entirety.

FIELD

The present invention relates to a long-length lens having two opposite oblong surfaces.

BACKGROUND

As a lens for use in a device such as an optical scanner of a laser printer, a lens including a lens portion having two opposite oblong lens surfaces (e.g., fθ lens) is known in the art. Such a lens may be formed by pouring a molten resin material through a gate into a mold which has a cavity contoured to form the shape of the lens and of which a temperature has been adjusted at a predetermined temperature, to fill the cavity with the molten resin material, thereafter letting the mold cool to solidify the material, and removing the solidified casting (molded lens product) from the mold.

The long-length lens such as an fθ lens has a cross-sectional area (i.e., an area of cross section taken along a plane perpendicular to a direction of a length of the lens) varying in accordance with the shape of the lens. To be more specific, for example, the fθ lens is designed to have a cross-sectional area decreasing gradually from a center toward each end in a direction of a length of the fθ lens. As a result, when a resin material is poured into the mold, a difference arises in flowability between a portion closer to a center in the direction of the length of the fθ lens and a portion closer to each end in the direction of the length of the fθ lens.

As the variations of the cross-sectional area along the length of the fθ lens are greater, a difference in thickness between the portion closer to the center in the direction of the length of the fθ lens and the portion closer to each end in the direction of the length of the fθ lens is greater accordingly, and thus, a difference in time required for the material to become solid between the thinnest portion and the thickest portion becomes greater.

The greater the difference in flowability or in time required for the material to become solid, the more likely a defect would develop in the molded product.

There is a need to provide a lens that is molded by injecting a resin material into a mold wherein a likelihood of the molded product suffering a defect is diminished.

SUMMARY

In one aspect of the present invention, there is provided a lens which comprises a lens portion and a rib portion. The lens portion has two opposite oblong surfaces, at least one of which is a curved lens surface having a refractive power. A cross-sectional area of the lens portion varies from a center toward each end in a longitudinal direction of the lens portion. The rib portion is disposed at each of two opposite sides of the lens portion that are adjacent to longer sides of the oblong surfaces of the lens portion, and extends along the longitudinal direction of the lens portion. A cross-sectional area of the rib portion varies along the longitudinal direction in a manner that renders variations of a cross-sectional area of a portion including the lens portion and the rib portion along the longitudinal direction smaller.

BRIEF DESCRIPTION OF THE DRAWINGS

The above aspect, its advantages and further features of the present invention will become more apparent by describing in detail illustrative, non-limiting embodiments thereof with reference to the accompanying drawings, in which:

FIGS. 5A-5F are schematic illustrations for explaining variations of a cross-sectional area of the fθ lens configured in accordance with an illustrative embodiment along the length thereof, in which FIG. 5A is a plan view, and FIGS. 5B, 5C, 5D, 5E and 5F are sectional views taken along lines B-B, C-C, D-D, E-E and F-F of FIG. 5A, respectively; and FIG. 6A-6F are schematic illustrations for explaining variations of a cross-sectional area of the fθ lens configured in accordance with a conventional design scheme (taken as a comparative example) along the length thereof, in which FIG. 6A is a plan view, and FIGS. 6B, 6C, 6D, 6E and 6F are sectional views taken along lines B-B, C-C, D-D, E-E and F-F of FIG. 6A, respectively.

DESCRIPTION OF EMBODIMENTS

A detailed description will be given of an illustrative embodiment of the present invention with reference made to the drawings where appropriate. In the following description, a general setup of an image forming apparatus in which an optical scanner including a lens according to the present embodiment is provided will be described at the outset, and then structural features of the lens will be described in detail.

General Setup of Laser Printer

Figure 1:
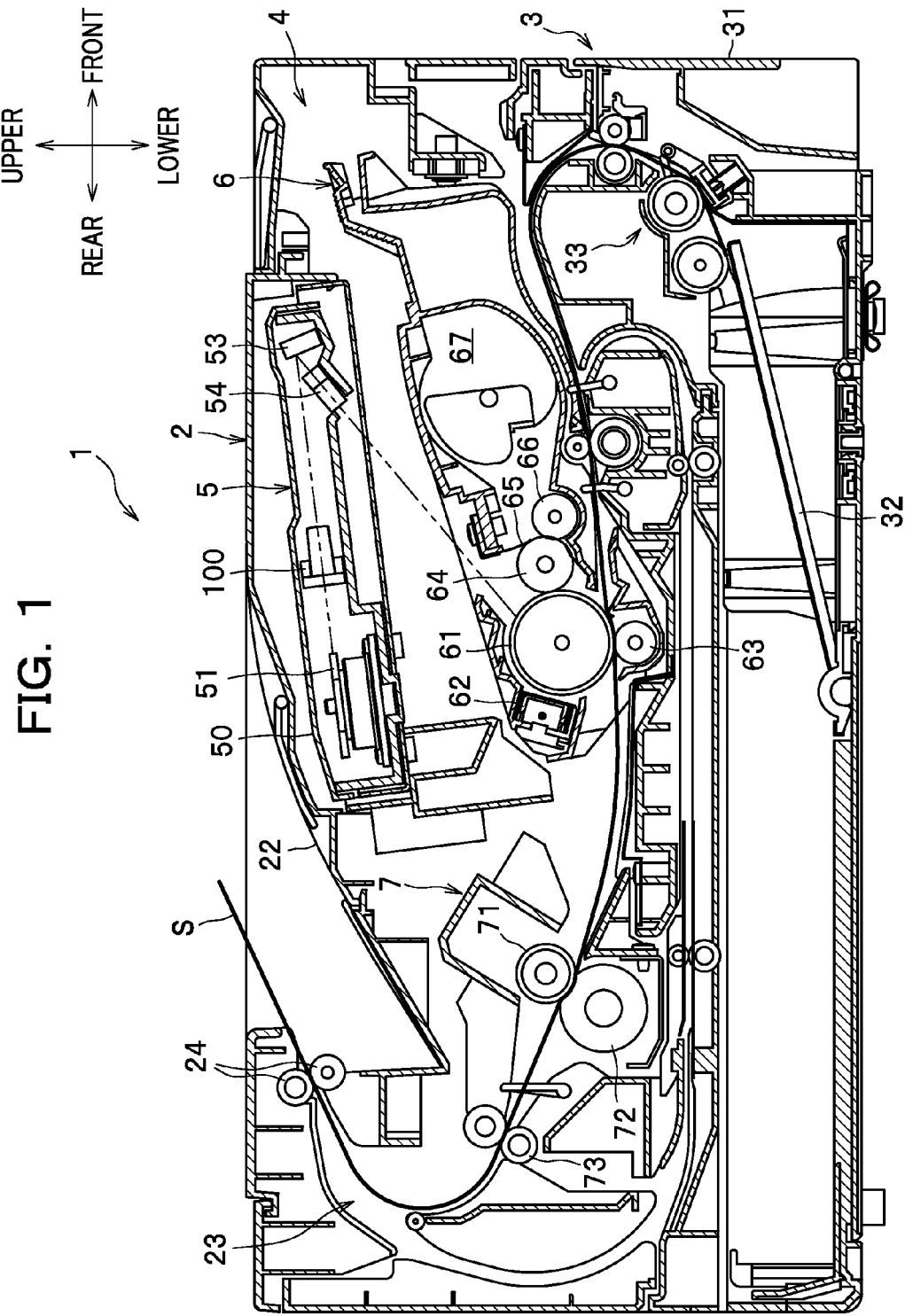
FIG. 1 is a schematic diagram of a laser printer which includes an fθ lens as one example of a lens according to an illustrative embodiment.

As shown in FIG. 1, a laser printer 1 (image forming apparatus) comprises a body casing 2, and several components housed within the body casing 2 which principally include a sheet feeder unit 3 for feeding a sheet S (e.g., of paper), and an image forming unit 4 for forming an image on the sheet S.

Hereinbelow, in describing the arrangement and operation of each component in the laser printer 1, the direction is designated as from the viewpoint of a user who is using (operating) the laser printer 1. To be more specific, in FIG. 1, the right-hand side of the drawing sheet corresponds to the "front" side of the printer, the left-hand side of the drawing sheet corresponds to the "rear" side of the printer, the front side of the drawing sheet corresponds to the "left" side of the printer, and the back side of the drawing sheet corresponds to the "right" side of the printer. Similarly, the direction of a line extending from top to bottom of the drawing sheet corresponds to the "vertical" or "up/down (upper/lower or top/bottom)" direction of the printer.

The sheet feeder unit 3 is disposed in a lower space inside the body casing 2, and principally includes a sheet feed tray 31, a sheet pressure plate 32 and a sheet conveyor mechanism 33. In the sheet feeder unit 3, sheets S in the sheet feed tray 31 are pressed upwardly by the sheet pressure plate 32, and each sheet S separated from the others is conveyed by the sheet conveyor mechanism 33 into the image forming unit 4.

The image forming unit 4 principally includes an optical scanner 5, a process cartridge 6, and a fixing unit 7.

The optical scanner 5 is disposed in an upper space inside the body casing 2, and comprises a substantially boxlike housing 50, and several components housed within the housing 50 which principally include a laser light source (not shown), a polygon mirror 51, an fθ lens 100 as one example of a lens, a reflecting mirror 53, and a cylindrical lens 54.

The polygon mirror 51 is shaped generally like a hexagonal column with six sides consisting of reflecting surfaces. The polygon mirror 51 spins at high speed and reflects a laser beam (see alternate long and short dashed lines) from the laser light source to cause the laser beam to change its direction along the main scanning direction so that the laser beam sweeps with constant angular velocity.

The fθ lens 100 is a scan lens through which the laser beam caused to change its direction and sweep by the polygon mirror 51 travels. In the fθ lens 100, the laser beam caused to sweep with constant angular velocity by the polygon mirror 51 is converted into a laser beam which sweeps with constant linear velocity. A detailed description of the fθ lens 100 will be given later.

The reflecting mirror 53 is configured to reflect the laser beam which has passed through the fθ lens 100 so that the laser beam is turned back toward the cylindrical lens 54.

The cylindrical lens 54 is a scan lens through which the laser beam reflected off the reflecting mirror 53 travels. In the cylindrical lens 54, the laser beam is refracted and converged in the sub-scanning direction.

In this optical scanner 5, a laser beam regulated according to image data and emitted from the laser light source reflects off or passes through the components, i.e., polygon mirror 51, fθ lens 100, reflecting mirror 53 and cylindrical lens 54, in this order, so that a peripheral surface of the photoconductor drum 61 is rapidly scanned (illuminated) with the laser beam.

The process cartridge 6 is disposed under the optical scanner 5, and configured to be installable in and removable from the body casing 2 through an opening which is formed when a front cover (not designated by reference numeral) provided at the body casing 2 is swung open. The process cartridge 6 principally includes a photoconductor drum 61, a charger 62, a transfer roller 63, a developing roller 64, a doctor blade 65, a supply roller 66, and a toner reservoir 67 for storing toner (developer).

In the process cartridge 6, the peripheral surface of the photoconductor drum 61 is uniformly charged by the charger 62, and then exposed to a rapidly sweeping laser beam from the optical scanner 5, so that an electrostatic latent image corresponding to the image data is formed on the peripheral surface of the photoconductor drum 61. Toner in the toner reservoir 67 is supplied via the supply roller 66 onto the developing roller 64, and passes through between the developing roller 64 and the doctor blade 65, so that a thin layer of toner having a predetermined thickness is carried on the developing roller 64.

The toner carried on the developing roller 64 is supplied from the developing roller 64 to the electrostatic latent image formed on the peripheral surface of the photoconductor drum 61. In this way, the electrostatic latent image is visualized and a toner image is formed on the peripheral surface of the photoconductor drum 61. Thereafter, a sheet S is conveyed through between the photoconductor drum 61 and the transfer roller 63, so that the toner image carried on the photoconductor drum 61 is transferred onto the sheet S.

The fixing unit 7 is disposed rearwardly of the process cartridge 6, and principally includes a heating roller 71 and a pressure roller 72 disposed opposite to the heating roller 71 to be pressed against the heating roller 71. In the fixing unit 7, the toner image transferred on the sheet S is thermally fixed on the sheet S while passing through between the heating roller 71 and the pressure roller 72. The sheet S with the toner image thermally fixed thereon is conveyed by conveyor rollers 73 along a sheet conveyor path 23 and ejected out from the sheet conveyor path 23 onto a sheet output tray 22 by output rollers 24.

Detailed Structure of fθ Lens

Next, a detailed structure of the fθ lens 100 will be described hereafter.

The fθ lens 100 in this embodiment is formed through a process comprising the steps of injecting a molten resin material into a mold having a cavity contoured to correspond to its specific shape, and letting the resin material solidified. The method for forming a lens configured in accordance with the present invention is not limited to a specific process, as long as the process includes the step of injecting a molten resin material into a mold having a cavity contoured to correspond to the specific shape of the lens consistent with the present invention.

Figure 2:
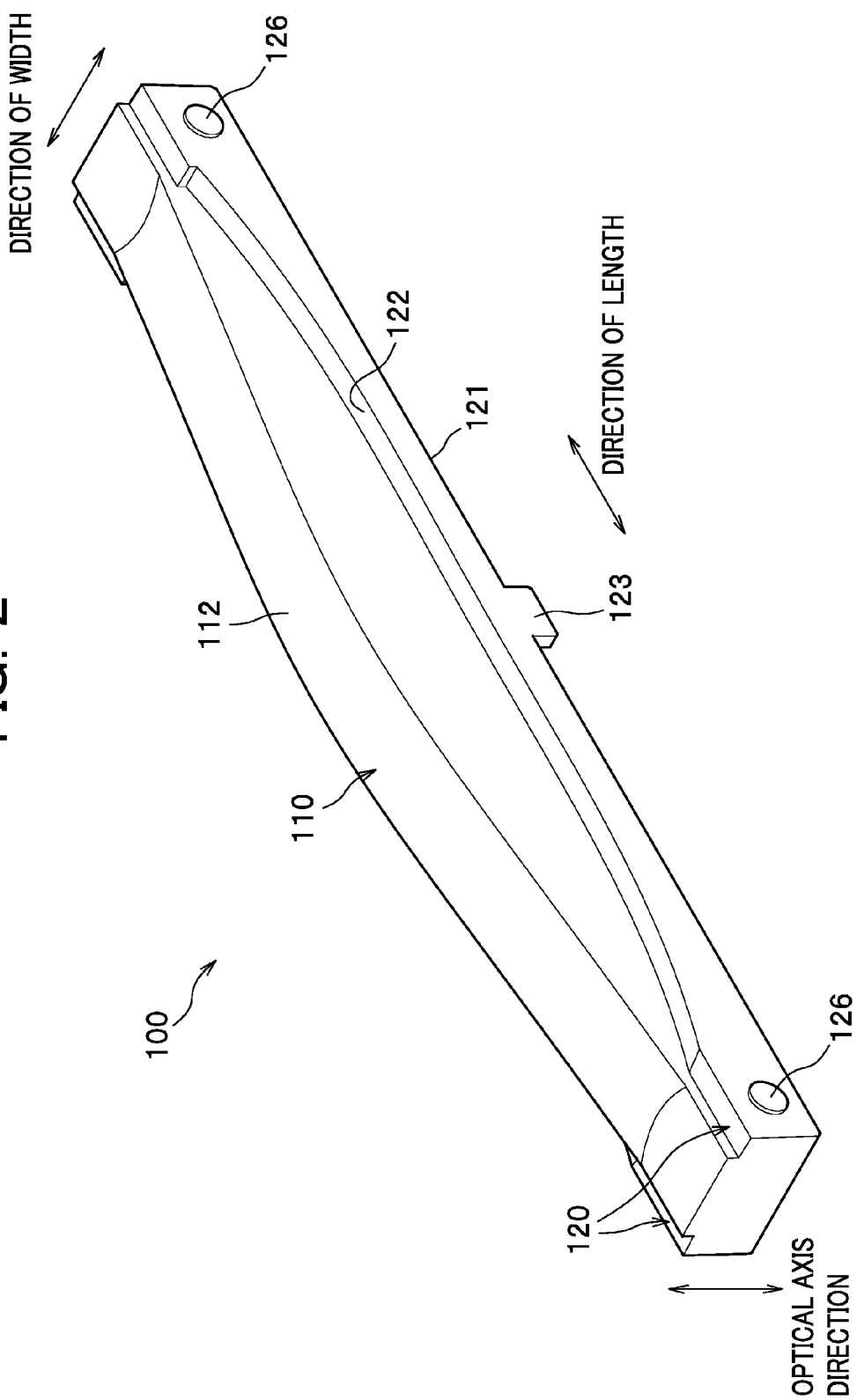
FIG. 2 is a perspective view of the fθ lens.

As shown in FIG. 2, the fθ lens 100 includes a lens portion 110 and a pair of rib portions 120. The lens portion 110 has two opposite oblong lens surfaces 111, 112 (see also FIG. 3) each having a refractive power such that a laser beam passing through these lens surfaces 111, 112 of the lens portion 110 is refracted. Each of these oblong lens surfaces 111, 112 of the lens portion 110 is shaped generally like a rectangle having two opposite longer sides (extending in a direction of its length) and two opposite shorter sides (extending in a direction of its width) as viewed from an optical axis direction. The rib portions 120 are provided to protrude outward from two opposite sides of the lens portion 110 which face in the direction of the widths of the oblong lens surfaces 111, 112.

The fθ lens 100 arranged in the optical scanner 5 is oriented such that a direction of the lengths of the oblong lens surfaces 111, 112 (or direction of the length of the lens portion 110) is aligned with the main scanning direction in which the laser beam is caused to sweep. The direction perpendicular to the direction of the lengths of the oblong lens surfaces 111, 112 and perpendicular to the optical axis direction is herein referred to as a direction of the widths of the oblong lens surfaces 111, 112. The direction of the length of the lens portion 110 will be referred to as "longitudinal direction" of the lens portion 110. In the following description, a cross-sectional area refers to an area of cross section taken along a plane perpendicular to the direction of the length of the lens portion 110.

Each of the oblong lens surfaces 111, 112 has a refractive power such that the oblong lens surfaces 111, 112 has the function of converging an incident laser beam on the peripheral surface of the photoconductor drum 61 while converting the laser beam sweeping with constant angular velocity into a laser beam sweeping with constant linear velocity over the peripheral surface of the photoconductor drum 61.

Figure 3:
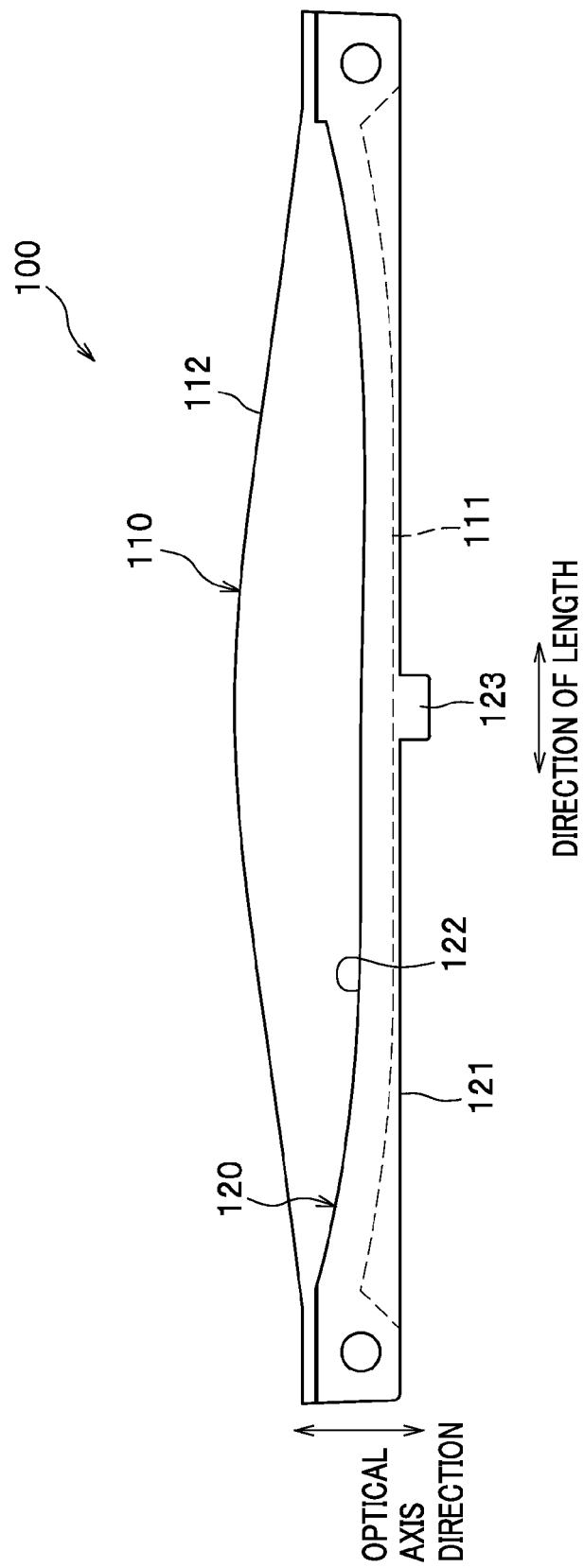
FIG. 3 is a plan view of the fθ lens.

As best seen in FIG. 3, each of the oblong lens surfaces 111, 112 of the lens portion 110 is configured to be a convex surface that curves outward along the length with a portion closer to a center in the direction of the length of each oblong lens surface 111, 112 between two opposite shorter sides thereof being located farther toward outside than portions closer to the shorter sides (both ends facing outward in the direction of the length) of the oblong lens surface 111, 112. With this configuration of the oblong lens surfaces 111, 112, the lens portion 110 has the thickness in the optical axis direction gradually thinner from the center toward the both ends in the longitudinal direction of the lens portion, so that a cross-sectional area S1 of the lens portion 110 decreases gradually from the center toward each end (see FIGS. 5A-5F). That is, the cross-sectional area S1 of the lens portion 110 varies in such a manner that a portion closer to the center thereof is larger than portions closer to the both ends thereof in the longitudinal direction of the lens portion 110.

Figure 4:
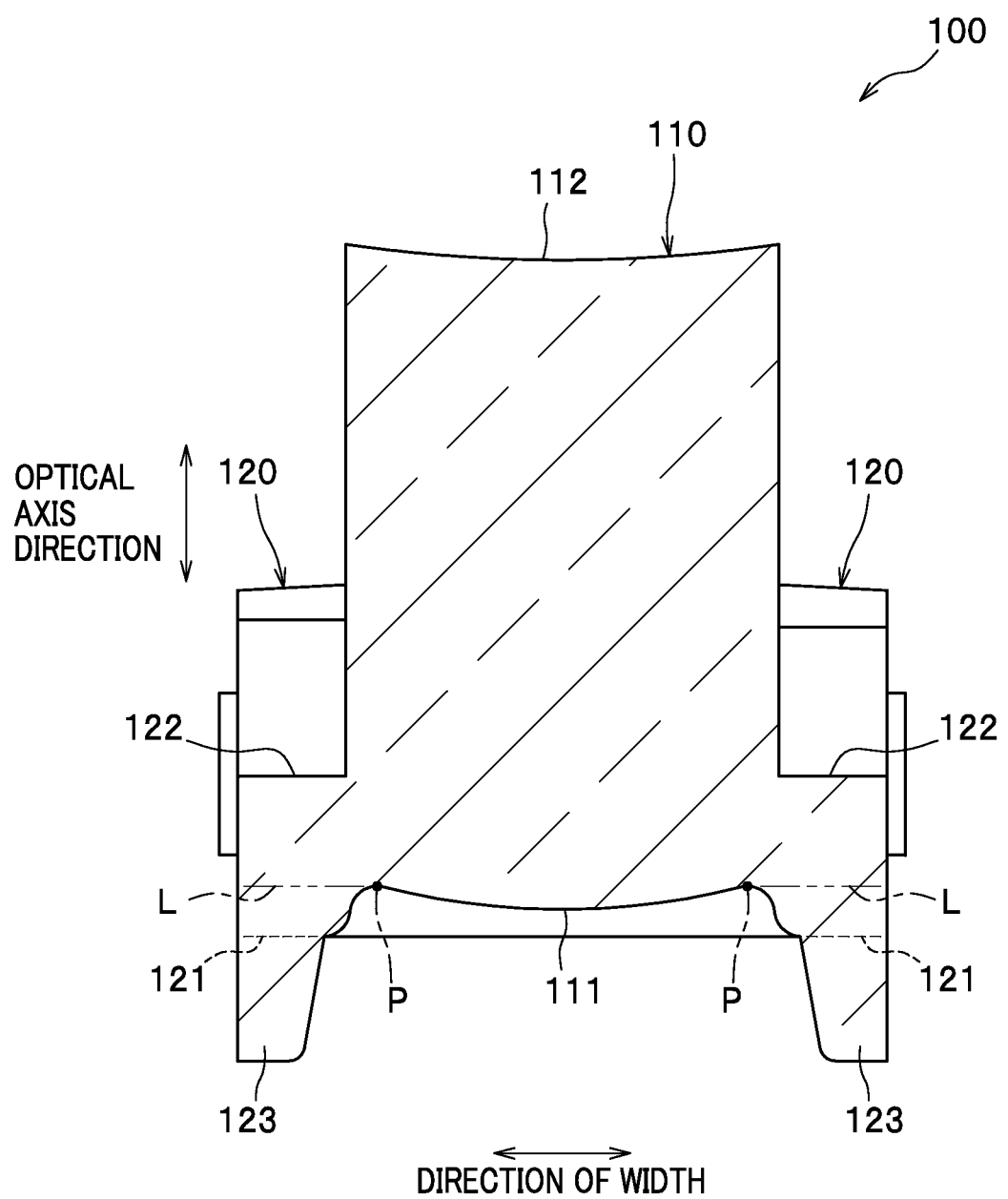
FIG. 4 is a sectional view of the fθ lens.

The rib portions 120 are formed on the both sides of the lens portion 110 facing toward the direction of the widths of the oblong lens surfaces 111, 112, and extend in the longitudinal direction of the lens portion 110. To be more specific, as shown in FIG. 4, each rib portion 120 is disposed in a position adjoining the oblong lens surface 111 (i.e., one of the oblong surfaces) along the length of the oblong lens surface 111 and separate from the oblong lens surface 112 (i.e., the other of the oblong surfaces).

Each rib portion 120 has opposite sides 121, 122 facing in the optical axis direction, and one of the sides 121, 122 (i.e., the side 121 closer to the oblong lens surface 111) is a flat surface extending in the longitudinal direction of the lens portion 110. A projection 123 protruding from each rib portion 120 outward in the optical axis direction is provided at the center in the direction of the length of the side 121 of the rib portion 120.

The projection 123 is a portion which is engaged with a corresponding recess provided in the housing 50 when the fθ lens 100 is mounted to the optical scanner 5 (e.g., in the housing 50 thereof). With the projection 123 engageable with the recess in the housing 50, the fθ lens 100 can be located in place easily in the housing 50.

As shown in FIGS. 2 and 3, at both end portions of each rib portion 120 (i.e., portions closer to the end faces facing outward in the direction of the length of the rib portion 120), a pair of locator protrusions 126 are formed which protrude outward in the direction of the widths of the oblong lens surfaces 111, 112 from two opposite sides of each rib portion 120 facing in the direction of the widths of the oblong lens surfaces 111, 112. Each locator protrusion 126 is shaped like a cylindrical column having a round end face. The locator protrusion 126 is a portion which is abutted on a corresponding abutment surface (not shown) of the housing 50 when the fθ lens 100 is mounted in the housing 50. With the locator protrusion 126 configured to be abutted on the corresponding abutment surface of the housing 50, the fθ lens 100 can be located in place in the direction of the widths of the oblong lens surfaces 111, 112 (in the sub-scanning direction) of the fθ lens 100 and can be fixed so that the fθ lens 100 is prevented from becoming shifted in the sub-scanning direction.

In view of the present invention, the projection 123 and the locator protrusion 126 are optional, and thus may be omitted.

The other of the sides 121, 122 of each rib portion 120 facing in the optical axis direction (i.e., the side 122 located in a position closer to the oblong lens surface 112 than a position in which the side 121 is located) is curved. To be more specific, the side 122 is, as shown in FIG. 3, contoured to approximate the convex shape of the oblong lens surface 111 facing to a direction opposite to that to which the side 122 (that is one of the opposite sides 121, 122 of the rib portion 120 facing in the optical axis direction) faces, as viewed from the direction of the widths of the oblong lens surfaces 111, 112.

More specifically, as shown in FIG. 4, the side 122 of each rib portion 120 is curved along a curved plane formed with a set of lines L, each represented in cross section (see chain double dashed lines) of FIG. 4 as extending from a dot P at each longer side of the oblong lens surface 111 (the longer side facing in the direction of the width thereof) outward in the direction of the width of the oblong lens surface 111.

With the shapes of the opposite sides 121, 122 of each rib portion 120 in the optical axis direction, as shown in FIG. 3, the thickness of the rib portion 120 in the optical axis direction increases gradually from the center to the both ends in the direction of the length of the rib portion 120. Thus, the cross-sectional area S2 of each rib portion 120 increases gradually, as shown in FIGS. 5B-5F, from the center (see FIG. 5D) toward the both ends (FIG. 5C to FIG. 5B, and FIG. 5E to FIG. 5F), in the direction of the length of the rib portion 120. That is, the cross-sectional area S2 of a portion closer to the center in the direction of the length of each rib portion 120 is larger than the cross-sectional area S2 of portions closer to the both ends in the direction of the length of each rib portion 120.

In other words, the cross-sectional area S2 of each rib portion 120 varies along the length of the rib portion 120 (actually, gradually increases from the center to the both ends in the direction of the length of the rib portion 120) in such a manner that variations of the cross-sectional area represented by (S1 plus S2 multiplied by 2) of a portion which includes the rib portions 120 and the lens portion 110 of which the cross-sectional area S1 gradually decreases to becomes smaller and thus variations of the cross-sectional area of the fθ lens 100 in its entirety becomes smaller. It is assumed that in the present embodiment the dimensions (width or thickness) of the lens portion 110 and the rib portions 120 in the direction of the widths of the oblong lens surfaces 111, 112 are substantially constant all along the lengths of the lens portion 110 and the rib portions 120, respectively.

Referring to FIGS. 6A-6F, in contrast, an fθ lens 100' illustrated as a comparative example is configured to include rib portions 120' each having a side 122' shaped to be a flat surface extending in the direction of the rib portion 120' like an opposite side 121 (see FIG. 6A). In this example, a cross-sectional area S2' of each rib portion 120' almost does not vary along the length of the rib portion 120', as shown in FIGS. 6B-6F. Consequently, according as the cross-sectional area S1 of the lens portion 110 varies, the variations of the cross-sectional area of the fθ lens 100' in its entirety along the length of the fθ lens 100' becomes greater.

According to the present embodiment where the fθ lens 100 includes the rib portions 120 configured as described above, variations of the cross-sectional area thereof in its entirety along the length of the fθ lens 100 can be rendered smaller in comparison with the comparative example where the fθ lens 100' includes the rib portions 120' as described above.

In FIGS. 5B-5F and 6B-6F, the lens portion 110 and the rib portions 120 (120') are hatched differently for convenience of illustration in order to clearly describe the variations of the cross-sectional areas. Illustration of the projection 123 is omitted, and the cross-sectional area of the projection 123 is not included in the cross-sectional area of the rib portions 120 (120') for the sake of simplicity.

The lens 100 configured as described above has several advantageous effects as follow.

Since the rib portions 120 are configured to have the cross-sectional area S2 varying along the length of the rib portion in a manner that renders variations of the cross-sectional area (S1 plus S2 multiplied by 2) of a portion including the rib portions 120 and the lens portion 110 along the longitudinal direction smaller, the variations of the cross-sectional area of the fθ lens 100 in its entirety along the length of the fθ lens 100 can be reduced. In this way, the difference in flowability of the resin material injected into a mold during manufacture between a portion closer to the center and a portion closer to the each end in the direction of the length of the fθ lens 100 can be reduced, with the result that the likelihood of the molded product suffering a defect can be reduced.

Since the fθ lens 100 is configured in accordance with the present embodiment such that variations of the cross-sectional area (S1 plus S2 multiplied by 2) of the portion including the lens portion 110 and the rib portions 120 in the longitudinal direction of the lens portion 120 is reduced, the difference in thickness (the dimension in the optical axis direction as in the present embodiment; additionally or alternatively, the dimension in the direction of the widths of the oblong lens surfaces 111, 112) between a portion closer to the center and a portion closer to each end of the fθ lens 100 in the direction of the length of the fθ lens 100 is smaller in comparison with that of the fθ lens 100' configured in accordance with the comparative example described above. Therefore, the difference in time required for the material to become solid between the thinnest portion and the thickest portion can be made smaller, so that the likelihood of the molded product suffering a defect can be reduced.

Moreover, the fθ lens 100 is configured in accordance with the present embodiment such that thickness (in the direction of the widths of the oblong lens surfaces 111, 112) of the thicker portion (i.e., the portion closer to the center in the direction of the length of the fθ lens 100) of the fθ lens 100 can be made thinner, and thus the time required for the resin material to become solid can be made shorter, in comparison with that of the fθ lens 100' configured in accordance with the comparative example described above. Consequently, the time required for molding (i.e., molding cycle) of the fθ lens 100 can be shortened, and the productivity can be increased.

Furthermore, the fθ lens 100 is configured in accordance with the present embodiment such that the side 122 (one of two opposite sides 121, 122 facing in the optical axis direction) of each rib portion 120 is formed to be a concave shape that curves inward with a portion closer to the center in the direction of the length of the rib portion 120 being located deeper toward inward than portions closer to each end of the rib portion 120 in the direction of the length of the rib portion 120, and thus the amount of material (resin) can be reduced in comparison with that of the fθ lens 100' configured in accordance with the comparative example described above. Accordingly, the manufacturing cost of the fθ lens 100 can be suppressed.

Since the side 122 of each rib portion 120 is gradually curved, variations of the cross-sectional area along the length of the fθ lens 100 in its entirety can be not only made smaller but also made gentler in comparison with the case where a rib portion has two opposite sides facing in the optical axis direction and one of these sides corresponding to the side 122 has a stepped profile. This ensures that the likelihood of the molded product suffering a defect can be materially reduced.

Since the side 122 of each rib portion 120 is contoured to approximate the shape of the oblong lens surface 111 of the lens portion 110 (i.e., one of the oblong lens surfaces 111, 112 that faces opposite to the side 122 in the optical axis direction), the cross-sectional area S2 of a portion of each rib portion 120 corresponding to a portion of the lens portion 110 of which the cross-sectional area S1 is larger is made smaller, while a cross-sectional area S2 of a portion of each rib portion 120 corresponding to a portion of the lens portion 110 of which the cross-sectional area S1 is smaller is made larger.

In this way, the profile of the side 122 contoured to approximate the shape of the oblong lens surface 111 makes the cross-sectional area S2 of each rib portion 120 varying inversely with the variations of the cross-sectional area S1 of the lens portion 110, and thus the variations of the total cross-sectional area of the fθ lens 100 along the length can be approximated to the minimum. This ensures that the likelihood of the molded product suffering a defect can be materially reduced.

Since each of the oblong lens surfaces 111, 112 is a convex surface that curves outward with a portion closer to the center in the direction of the length of the oblong lens surface 111, 112 being located farther toward outside than portions closer to the both ends in the direction of the length of the oblong lens surface 111, 112, the cross-sectional area S1 of the lens portion 110 gradually decreases from the center toward each end along the length of the lens portion 110. In this embodiment, each rib portion 120 disposed at each of two opposite sides of the lens portion adjacent to the longer sides of the oblong lens surfaces 111, 112 of the lens portion 110 along the length of the lens portion 110 is configured to have the cross-sectional area S2 gradually decreasing from the center toward the both ends along the length of the rib portion 120, and thus each rib portion 120 can be designed to have a reduced volume in comparison with some conventional lenses having a similar rib portion with a side contoured to the shape of the side of the lens portion to which the rib portion is provided, as viewed from the direction of the widths of the oblong surfaces (e.g., see JP 2003-305754 A), or the fθ lens 100' configured in accordance with the comparative example described above in which the cross-sectional area S2' along the length of each rib portion 120' almost does not vary.

With this configuration, the amount of material used for manufacture of the lens can be reduced, and thus the manufacturing cost can be suppressed. Furthermore, the thickness of the fθ lens 100 in the direction of the widths of oblong lens surfaces 111, 112 at a portion of the fθ lens 100 closer to the center in the direction of the length thereof can be reduced in comparison with the aforementioned conventional lenses or the fθ lens 100' configured in accordance with the comparative example described above. Therefore, the molding cycle can be shortened, and the productivity can be increased.

Each rib portion 120 is located only at a side of the oblong lens surface 111 (but not at a side of the oblong lens surface 112). To be more specific, the rib portion 120 disposed at each of the two opposite sides of the lens portion 110 is in a position adjoining the oblong lens surface 111 and separate from the oblong lens surface 112. Compared with an alternative configuration in which the rib portion 120 is in a position adjoining the both oblong lens surfaces 111, 112, the fθ lens 100 configured according to the present embodiment can be removed from the mold with increased ease when it is made. As a result, the productivity can be increased. Moreover, compared with the alternative configuration in which the rib portion 120 is in a position adjoining the both oblong lens surfaces 111, 112, the fθ lens 100 configured according to the present embodiment can be made with a reduced amount of material used for manufacture thereof, and thus the manufacturing cost can be suppressed.

The side 121 of each rib portion 120 can be utilized as a surface with which an ejector pin is brought into contact when the fθ lens 100 is removed from the mold. Since this side 121 is configured to be flat, the fθ lens 100 can be thrust out with the ejector pin in a stable manner. This makes it easy to remove the fθ lens 100 from the mold and increases the productivity. Furthermore, the side 121 configured to be flat can be utilized as an abutting surface (e.g., as a locator surface) when the fθ lens 100 is mounted in the optical scanner 5 (to the housing 50 thereof).

Although the illustrative embodiment of the present invention has been described above, the present invention is not limited to the above-described embodiment. Various modifications and changes may be made to the specific structures and arrangement without departing from the scope of the present invention.

In the above-described embodiment, each rib portion 120 as illustrated is provided only along a longer side of one of the oblong surfaces (oblong lens surface 111), but the present invention is not limited to this specific configuration. For example, each rib portion may be provided only along a longer side of the other of the oblong surfaces (oblong lens surface 112). Alternatively, the rib portion may be provided in a position such that the rib portion adjoins the two oblong surfaces (oblong lens surfaces 111, 112) at each of the two opposite sides of the lens portion 110 adjacent to the longer sides of the oblong surfaces 111, 112 of the lens portion 110.

In the above-described embodiment, each rib portion 120 is configured to have two opposite sides 121, 122 facing in the optical axis direction and only the side 121 thereof is curved. However, the present invention is not limited to this specific configuration, and the both sides 121, 122 may be configured to be curved.

In the above-described embodiment, the side 122 of each rib portion 120 is contoured to approximate the shape of the oblong lens surface 111, but the present invention is not limited to this specific configuration, and the side 122 of each rib portion 120 may be contoured to approximate a shape different to the shape of the oblong lens surface 111; for example, it may be shaped like a segment of a circle or a segment of an ellipse as viewed from the direction of the widths of the oblong lens surfaces 111, 112.

The feature which may be defined as "a side of the rib portion facing in the optical axis direction is contoured to approximate a shape of one of the oblong surfaces of the lens portion facing opposite thereto in the optical axis direction" in accordance with the present embodiment implies that the side has a shape substantially tracing (or following) the shape of the relevant oblong surface, and is intended to encompass the cases where the shape of the side precisely coincide with the shape of the oblong surface and where the shape of the side does not precisely coincide with the shape of the oblong surface.

The shape of the rib portion is not limited to the illustrated embodiment as long as the cross-sectional area of the rib portion varies along the length of the rib portion in a manner that renders variations of the cross-sectional area of a portion including the lens portion and the rib portion along the length of the lens smaller. For example, at least one of the sides of the lens portion in the optical axis direction may have a stepped profile. The side of the rib portion facing outward in the direction of the widths of the oblong surfaces (i.e., the side adjacent to the longer sides of the oblong surfaces) may be configured to vary in shape (in this configuration, the both sides of each rib portion facing in the optical axis direction may be configured to be flat).

In the above-described embodiment, each of the oblong lens surfaces 111, 112 is configured to be a convex surface that curves outward with a portion closer to a center in a direction of a length of the oblong lens surface 111, 112 being located farther toward outside than portions closer to both ends in the direction of the length of the oblong lens surface 111, 112. The present invention is, however, not limited to this specific configuration. The oblong lens surface consistent with the present invention may be configured to a concave surface that curves inward with a portion closer to the center in the direction of the length of the oblong lens surface being located deeper toward inward than portions closer to the both ends in the direction of the length of the oblong lens surface. The configurations of the two oblong lens surfaces may be either symmetric or asymmetric. For example, the two opposite oblong lens surfaces may be configured such that one is a convex surface and the other is a concave surface.

In the above-described embodiment, the fθ lens 100 is described by way of example; however, the type of lens to which the present invention is applicable is not limited to the fθ lens. That is, any type of lens can be designed in accordance with the present invention as long as the lens includes a lens portion having two opposite oblong surface. For example, a long-length cylindrical lens may be designed in accordance with the present invention.

In the above-described embodiment, the both of the oblong lens surfaces 111, 112 are designed to be curved lens surfaces each having a refractive power. However, the present invention is not limited to this specific design, and if at least one of the oblong surfaces of the lens has a refractive power, the present invention may be applied advantageously thereto. For example, the oblong surfaces may be configured such that one is a curved lens surface having a refractive power and the other is a flat surface having no refractive power.

The invention claimed is:

1. A lens comprising:
   a lens portion having two opposite oblong surfaces, at least one of which is a curved lens surface having a refractive power, a cross-sectional area of the lens portion varying from a center of the lens portion toward each end of the lens portion in a longitudinal direction of the lens portion; and
   a rib portion disposed at each of two opposite sides of the lens portion that are adjacent to longer sides of the oblong surfaces of the lens portion, the rib portion extending along the longitudinal direction of the lens portion,
   wherein a cross-sectional area of the rib portion varies along the longitudinal direction in a manner that reduces variations of a cross-sectional area of a portion including the lens portion and the rib portion along the longitudinal direction,
   wherein a dimension of the lens portion in an optical axis direction decreases along a length of the lens in the longitudinal direction from the center of the lens portion toward each end of the lens portion, and
   wherein a dimension of the rib portion in the optical axis direction increases along a length of the rib portion in the longitudinal direction from the center of the rib portion toward each end of the rib portion.

2. The lens according to claim 1, wherein the rib portion has two opposite sides facing in an optical axis direction, at least one of which is curved.

3. The lens according to claim 1, wherein the rib portion has two opposite sides facing in an optical axis direction, at least one of which is contoured to approximate a shape of one of the oblong surfaces of the lens portion which faces opposite thereto in the optical axis direction.

4. The lens according to claim 1, wherein the rib portion is in a position adjoining one of the oblong surfaces and separate from the other.

5. The lens according to claim 1, wherein the curved lens surface is a convex surface that curves outward with a portion closer to a center of the curved lens surface in the longitudinal direction being located farther toward outside than portions closer to both ends of the curved lens surface in the longitudinal direction.

6. The lens according to claim 1, wherein the rib portion has two opposite sides facing in an optical axis direction, one of which is flat.

\* \* \* \* \*